United States Patent
Matsumoto

[19]

[11] Patent Number: 5,949,062
[45] Date of Patent: Sep. 7, 1999

[54] IMAGE SENSOR SECURED TO A FRAME

[75] Inventor: Toshio Matsumoto, Tokyo, Japan

[73] Assignee: Mitsubishi Denki Kabushiki Kaisha, Japan

[21] Appl. No.: 09/003,469

[22] Filed: Jan. 5, 1998

[30]     Foreign Application Priority Data

Sep. 5, 1997  [JP]  Japan .................................... 9-241124

[51] Int. Cl.$^6$ .................................................... H04N 1/04
[52] U.S. Cl. ........................ 250/208.1; 250/239; 358/474
[58] Field of Search ................................ 250/208.1, 216, 250/239; 358/471, 474; 257/433

[56]             References Cited

U.S. PATENT DOCUMENTS

| 5,268,765 | 12/1993 | Yamashita | 348/245 |
| 5,383,034 | 1/1995 | Imamura et al. | 358/474 |
| 5,489,995 | 2/1996 | Iso et al. | 358/483 |
| 5,517,329 | 5/1996 | Ishizuka | 358/474 |
| 5,859,421 | 1/1999 | Onishi et al. | 250/208.1 |

FOREIGN PATENT DOCUMENTS 7170373  7/1995  Japan .

OTHER PUBLICATIONS

08590348, Jan. 1996 Yamashita.

*Primary Examiner*—Edward P. Westin
*Assistant Examiner*—Thanh X. Luu
*Attorney, Agent, or Firm*—Rothwell, Figg, Ernst & Kurz, p.c.

[57]            ABSTRACT

An image sensor with a light-receiving-element mounting substrate secured to a frame by bringing the light-receiving-element mounting substrate into close contact with the frame at a uniform and proper pressure, making the optical position of a sensor IC to a manuscript to be read and a rod lens array accurate, and showing a superior resolution. The image sensor comprises a frame which has a first plane contacting with a manuscript to be read and a second plane facing the first plane and in which a hollow portion having an aperture on the first plane and the second plane respectively is formed; a light source for applying light to the manuscript to be read; condensing means for condensing the light reflected from the manuscript to be read; a light-receiving-element mounting substrate set so as to cover the aperture formed on the second plane, a light-receiving element mounted on the mounting plane of the light-receiving-element mounting substrate so as to face the condensing means, and an adhesive tape pasted so as to cover the back of the light-receiving-element mounting substrate and two sides of the frame to secure the light-receiving-element mounting substrate to the second plane by bringing the substrate into close contact with the plane.

7 Claims, 5 Drawing Sheets

# IMAGE SENSOR SECURED TO A FRAME

BACKGROUND OF THE INVENTION

1. Field of the Invention

The present invention relates to an image sensor used for the image input section of a facsimile system and the like.

2. Description of the Related Art

FIG. 12 is a side view of the conventional image sensor disclosed in, for example, the official gazette of Japanese Unexamined Patent Publication No. 6-169370. FIG. 13 is a sectional view of the image sensor in FIG. 12, taken along the line XIII–XIII in FIG. 12. In FIGS. 12 and 13, a frame 7 is formed into an almost rectangular-parallelepiped frame having a length almost equal to the width of a manuscript 100 to be read, which has a first plane 7a, a second plane 7b facing the first plane 7a, and two sides 7c and 7d connecting the first plane 7a and the second plane 7b and whose inside is almost hollow. The hollow portion has an aperture on the first plane 7a and the second plane 7b and it is formed over the almost overall length of the frame 7 long the longitudinal direction. In the hollow portion, a protrusion 7e is formed over the almost overall length along the longitudinal direction from the back of the side 7d toward the inside of the frame 7. The protrusion 7e divides the hollow portion into two hollow portions such as a first hollow portion 7f and a second hollow portion 7g.

The protrusion 7e supports an erect-1×magnification-image-forming rod lens array 4 extending along the longitudinal direction of the frame 7 in the hollow portion. The rod lens array 4 is extended over the almost overall length of the frame and constituted by linearly connecting a plurality of rod lenses. In FIG. 13, though the protrusion 7e seems to be divided at a portion for supporting the rod lens array 4, it is integrally connected to the both ends of the frame 7.

A rectangular flat glass plate 6 extending in the longitudinal direction of the frame 7 is secured to the first plane 7a of the frame 7 so as to cover the aperture. Moreover, a rectangular flat light-receiving-element mounting substrate 2 extending in the longitudinal direction is set to the second plane 7b so as to cover the aperture. Reference planes 7h and 7i are formed on the margin of the aperture formed on the second plane 7b along the longitudinal direction of the frame 7. The light-receiving-element mounting substrate 2 is positioned because the reference planes 7h and 7i are pressed against the substrate 2 and secured by a securing hardware 13. The securing hardware 13 is made of an elastic metal and has an U-shaped cross section, on whose both ends a pawl 13a is formed. Moreover, a groove 7j is formed on the sides 7c and 7d of the frame 7 along the longitudinal direction so as to engage with the pawl 13a respectively. The securing hardware 13 is set in places at almost equal intervals along the longitudinal direction of the frame 7 to secure the light-receiving-element mounting substrate 2.

A plurality of light-emitting diodes 3 are linearly arranged on the mounting plane facing the hollow portion 7f of the light-receiving-element mounting substrate 2 along the longitudinal direction of the frame 7 to constitute a line light source.

Moreover, a plurality of sensor ICs 5 are linearly arranged on the mounting plane facing the hollow portion 7g of the light-receiving-element mounting substrate 2 long the longitudinal direction of the frame 7 at a pitch of several millimeters. The sensor ICs 5 are arranged so as to face the rod lens array 4.

An image sensor thus constituted is used for, for example, an apparatus such as a facsimile system and the manuscript 100 to be read moves while contacting the glass plate 6. The light emitted from a plurality of light-emitting diodes 3 serving as a line light source passes through the glass plate 6 to illuminate the manuscript 100.

The illumination light reflects in accordance with the light-and-shade information of an image drawn on the manuscript 100 and passes through rod lenses of the rod lens array 4, and it is condensed to the sensor ICs 5. A plurality of sensor ICs 5 accumulate electric charges in accordance with the intensity of reflected light and the accumulated electric charges are output through the light-receiving-element mounting substrate 2.

The conventional image sensor is constituted as described above and the securing hardware 13 is provided in places along the longitudinal direction of the frame 7. Therefore, the light-receiving-element mounting substrate 2 at a portion for which the securing hardware 13 is not provided is separated and lifted from the reference planes 7h and 7i. Thus, the optical positional relation between the sensor ICs 5 on one hand and the manuscript 100 or the rod lens array 4 on the other collapses and therefore, the focus is deviated and the resolution is deteriorated as an image sensor.

Moreover, fluctuation occurs in the pressure for the securing hardware 13 to press the light-receiving-element mounting substrate 2 depending on the range of the dimensional tolerance of the thickness of the light-receiving-element mounting substrate 2, that of the securing hardware 13, or that of the groove 7j and the light-receiving-element mounting substrate 2 is lifted from the reference planes 7h and 7i and the resolution is deteriorated when the pressure is too low. Moreover, when the pressure is too high, the light-receiving-element mounting substrate 2 is deformed and thereby, the sensor ICs 5 mounted on the substrate 2 may be removed.

SUMMARY OF THE INVENTION

The present invention is made to solve the above problems and its object is to provide an image sensor capable of securing a light-receiving-element mounting substrate to a frame at a uniform and proper pressure, making the optical position of a sensor IC to a manuscript to be read or rod lens array accurate, and realizing a high resolution.

An image sensor of claim 1 comprises a frame having a first plane contacting with a manuscript to be read, a second plane facing the first plane, and two sides connecting the first and second planes, in which a hollow portion having apertures on the first and second planes respectively is formed, a light source set in the hollow portion to apply light to the manuscript to be read through the aperture formed on the first plane, condensing means supported by the frame in the hollow portion to condense the light reflected from the manuscript to be read, a light-receiving-element mounting substrate set so as to cover the aperture formed on the second plane by turning the mounting plane thereof toward the hollow portion, a light-receiving element mounted on the mounting plane of the light-receiving-element mounting substrate so as to face the condensing means to receive the reflected light condensed by the condensing means, and an adhesive tape pasted so as to cover the back of the light-receiving-element mounting substrate and two sides of the frame to secure the light-receiving-element mounting substrate to the second plane by bringing the substrate into close contact with the second plane.

In the case of an image sensor of claim 2, the adhesive tape is transparent.

In the case of an image sensor of claim 3, at least one corner formed by the second plane and the side of the frame is chamfered.

In the case of an image sensor of claim 4: a protruded part protruded on the back of the light-receiving-element mounting substrate or an exposed part exposed on the back of the light-receiving-element mounting substrate is provided for the central portion in the longitudinal direction of the light-receiving-element mounting substrate, the adhesive tape is divided into two pieces not so as to cover the protruded or exposed part, and the two pieces of the adhesive tape have the same length.

In the case of an image sensor of claim 5, a protruded part protruded on the side of the frame or an exposed part exposed on the side of the frame is provided for the central portion in the longitudinal direction of the frame the adhesive tape is divided into two pieces not so as to cover the protruded part or exposed part, and the two pieces of the adhesive tape have the same length.

In the case of an image sensor of claim 6, the adhesive tape is made by using a metallic foil as the base material.

In the case of an image sensor of claim 7, the both ends of the light-receiving-element mounting substrate are bonded to a frame.

DESCRIPTION OF THE PREFERRED EMBODIMENTS

Figure 1:
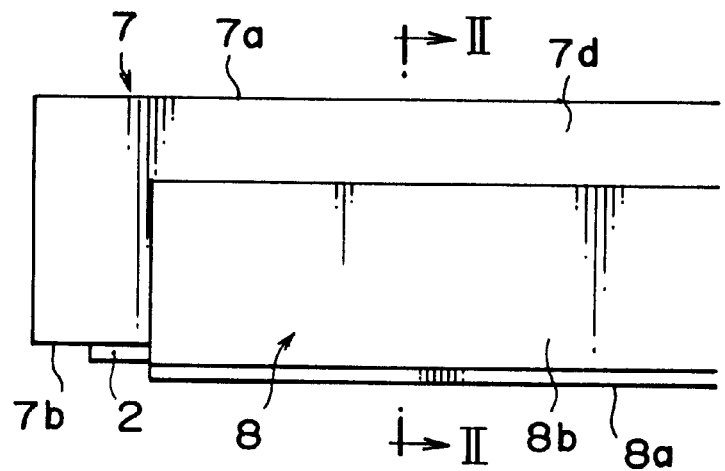
FIG. 1 is a side view of an image sensor of the present invention.
Figure 2:
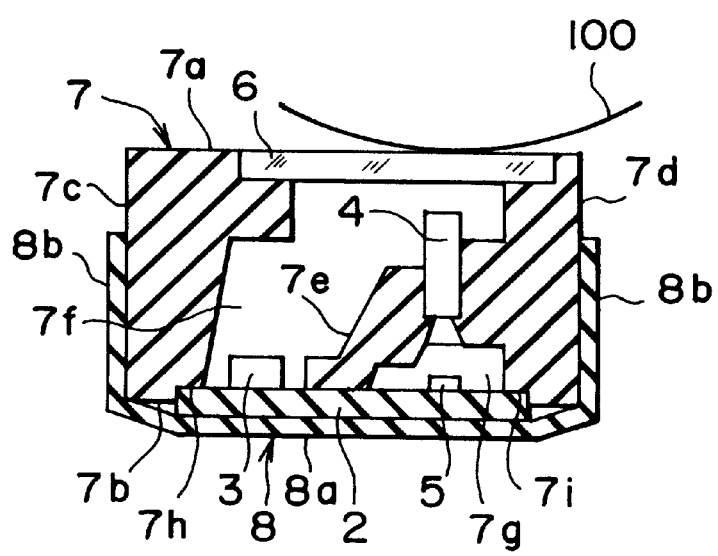
FIG. 2 is a sectional view of the image sensor in FIG. 1, taken along the line II—II in FIG. 1.

Embodiment 1:

FIG. 1 is a side view of an image sensor of the present invention. FIG. 2 is a sectional view of the image sensor in FIG. 1, taken along the line II—II in FIG. 1. In FIGS. 1 and 2, a frame 7 is formed into an almost rectangular-parallelepiped frame having a length almost equal to the width of a manuscript 100 to be read and manufactured by molding a plastic resin, and the inside of the frame 7 is almost hollow. The frame 7 has a first plane 7a contacting with a manuscript to be read, a second plane 7b facing the first plane 7a and sides 7c and 7d connecting the first plane 7a and the second plane 7b, and the hollow portion is formed over the almost overall length of the frame 7 along the longitudinal direction by having an aperture on the first plane 7a and the second plane 7b respectively. In the hollow portion, a protrusion 7e is formed over the almost overall length along the longitudinal direction from the back of the side 7d toward the inside of the frame 7. The protrusion 7e divides the hollow portion into two hollow portions such as a first hollow portion 7f and a second hollow portion 7g.

The protrusion 7e supports an erect-1×magnification-image-forming rod lens array 4 serving as condensing means extending along the longitudinal direction of the frame 7 in the hollow portion. The rod lens array 4 is extended over the almost overall length of the frame 7, in which a plurality of rod lenses are linearly connected. In FIG. 2, though the protrusion 7e seems to be divided at a portion for supporting the rod lens array 4, it is integrally connected at the both ends of the frame 7.

A rectangular flat glass plate 6 extending in the longitudinal direction of the frame 7 is secured to the first plane 7a of the frame 7 so as to cover an aperture. Moreover, a rectangular light-receiving-element mounting substrate 2 extending in the longitudinal direction is set to the second plane 7b so as to cover an aperture. Reference planes 7h and 7i are formed on the margin of the aperture formed on the second plane 7b along the longitudinal direction of the frame 7. The light-receiving-element mounting substrate 2 is positioned by being pressed against the reference planes 7h and 7i and secured by a transparent one-side adhesive tape 8 using plastic as the base material. The one-side adhesive tape 8 is provided over the almost overall length in the longitudinal direction of the light-receiving-element mounting substrate 2, the central portion 8a of the tape 8 is pasted to the light-receiving-element mounting substrate 2, and the both ends 8b of the tape 8 are pasted to the sides 7c and 7d of the frame 7 to elastically secure the light-receiving-element mounting substrate 2 so as to press the light-receiving-element mounting substrate 2 against the reference planes 7h and 7i.

A plurality of light-emitting diodes 3 are linearly arranged on the mounting plane facing the hollow portion 7f of the light-receiving-element mounting substrate 2 along the longitudinal direction of the frame 7 to constitute a line light source. Moreover, a plurality of sensor ICs 5 serving as light-receiving elements are linearly arranged on the mounting plane facing the hollow portion 7g of the light-receiving-element mounting substrate 2 at a pitch of several millimeters along the longitudinal direction of the frame 7. The sensor ICs 5 are arranged so as to face the rod lens array 4.

An image sensor thus constituted is used for an apparatus such as a facsimile system and a manuscript 100 to be read moves while contacting the glass plate 6. The light emitted from the light-emitting diodes 3 serving as a line light source passes through the glass plate 6 to illuminate the manuscript 100. The illumination light reflects in accordance with the light-and-shade information of an image drawn on the manuscript 100 and passes through the rod lenses of the rod lens array 4, and it is condensed by the sensor ICs 5. The sensor ICs 5 accumulates electric charges in accordance with the intensity of reflected light and it is output to the outside through the light-receiving-element mounting substrate 2.

An image sensor thus constituted uses the one-side adhesive tape 8 as means for securing the light-receiving-element mounting substrate 2 to the frame 7. The one-side adhesive tape 8 is optionally folded at a proper position of the tape 8 in accordance with a slight difference of dimension between the light-receiving-element mounting substrate 2 and the frame 7 and the both ends of the tape 8 are pasted to the sides 7c and 7d. Therefore, even if the light-receiving-element mounting substrate 2 and the frame 7 have a dimensional tolerance or dimensional error, it is possible to always secure the frame 7 to the light-receiving-element mounting substrate 2 at a proper uniform pressure. Therefore, it is possible to accurately keep the positions of the sensor ICs 5 for the manuscript 100 to be read and the rod lens array 4 and the resolution of the image sensor is kept preferably.

Moreover, because the one-side adhesive tape 8 is transparent, an operator can paste the tape 8 to a proper position while confirming the positions of the light-receiving-element mounting substrate 2 and the frame 7 through the tape 8. Therefore, it is possible to prevent an nonuniform pressure from being produced due to a positional deviation of the one-side adhesive tape 8.

Moreover, it is possible to form the frame 7 by extrusion-molding not only a plastic resin but also a metal such as aluminum. Furthermore, the glass plate 6 can be omitted as long as a structure is used in which the manuscript 100 to be read can be accurately positioned to an aperture formed on the first plane 7a. Furthermore, it is not always necessary to use the light-emitting diodes 3 as the line light source. Furthermore, it is not always necessary to set the line light source on the light-receiving-element mounting substrate 2. It is also possible to set the line light source in the hollow portion 7f so as to be supported by the frame 7.

Furthermore, it is possible to use not only plastic but also vinyl or cellophane as the base material of the one-side adhesive table 8. Furthermore, it is possible for the one-side adhesive tape 8 to have any transparency as long as the light-receiving-element mounting substrate 2 can be confirmed through the tape 8. Therefore, it is permitted that the tape 8 is for example, white.

Figure 3:
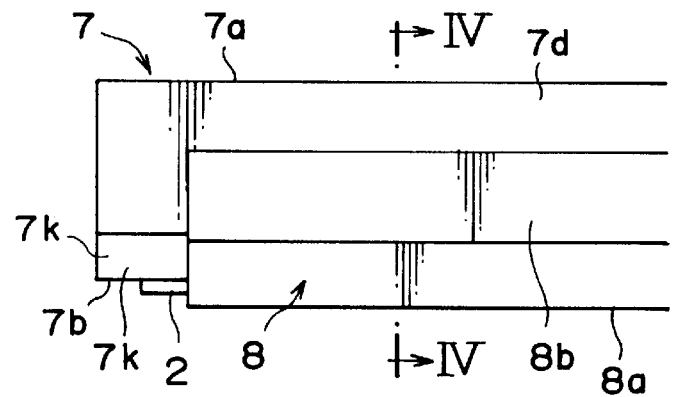
FIG. 3 is a side view showing another embodiment of an image sensor of the present invention.
Figure 4:
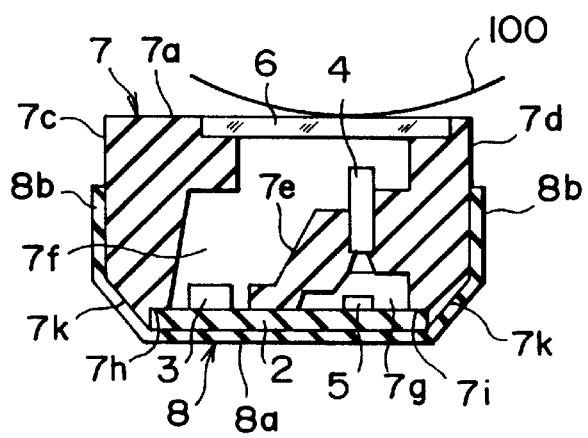
FIG. 4 is a sectional view of the embodiment in FIG. 3, taken along the line IV—IV in FIG. 3.

Embodiment 2:

FIG. 3 is a side view showing another embodiment of an image sensor of the present invention. FIG. 4 is a sectional view of the embodiment in FIG. 3, taken along the line IV—IV in FIG. 3. In the case of this embodiment, the corner formed by a second plane 7b and a side 7c of a frame 7 and the corner formed by the second plane 7b and a side 7d of the frame 7 are chamfered at an angle of approx. 45 and a chamfered portion 7k is formed. That is, the chamfered portion 7k is formed at a position where a one-side adhesive tape 8 is folded. Other structures are the same as those of the embodiment 1.

In the case of an image sensor thus constituted, the chamfered portion 7k is formed at a position where the one-side adhesive tape 8 is folded. Therefore, it is possible to moderate the angle at which the one-side adhesive tape 8 is folded and thereby, the force for pulling the light-receiving-element mounting substrate 2 toward the frame 7 is greatly stabilized. Thus, the light-receiving-element mounting substrate 2 is secured by a high stable pressure and it is possible to keep the positional relation more accurately.

In the case of this embodiment, the chamfered portion 7k is formed at two corners formed by the second plane 7b and two sides 7c and 7d of the frame 7. However, even if the chamfered portion 7k is formed only on each corner, an advantage can be obtained in its own way.

Figure 5:
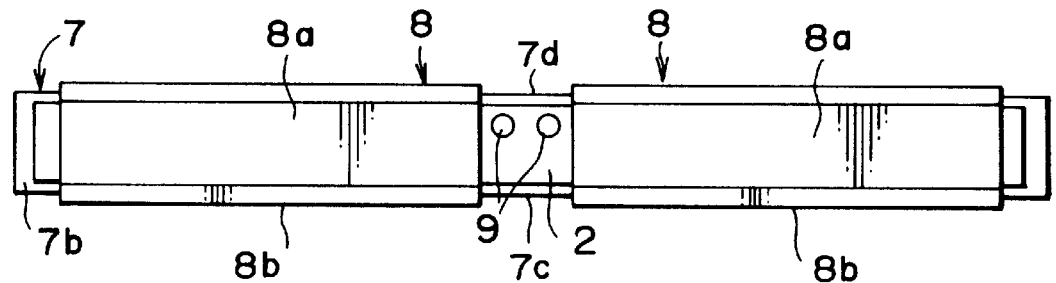
FIG. 5 is a back view showing still another embodiment of an image sensor of the present invention.

Embodiment 3:

FIG. 5 is a back view showing still another embodiment of an image sensor of the present invention. In the case of this embodiment, a volume resistance 9 mounted on a light-receiving-element mounting substrate 2 and provided so as to expose a knob to the back from a through-hole formed on the light-receiving-element mounting substrate 2 is set to the central portion of the light-receiving-element mounting substrate 2 extending in the longitudinal direction of a frame 7. The volume resistance 9 adjusts the gain and offset of the output of a sensor IC 5 when the knob is rotated with a tool such as a screwdriver. The knob is stored in the through-hole but it is not protruded from the light-receiving-element mounting substrate 2. However, because a tool such as a screwdriver is inserted into the through-hole, a one-side adhesive tape 8 is not provided for the portion of the volume resistance 9. Moreover, two pieces of the one-side adhesive tape 8 divided at the portion of the volume resistance 8 have the same length at the right and left. Other structures are the same as that of the embodiment 1.

In the case of an image sensor thus constituted, the volume resistance 9 for adjusting the gain and offset of the output of the sensor IC 5 is provided for the central portion of the light-receiving-element mounting substrate 2 and two pieces of the one-side adhesive tape 8 have the same length at the right and left. Therefore, it is possible to stably secure the light-receiving-element mounting substrate 2 at a good balance.

Figure 6:
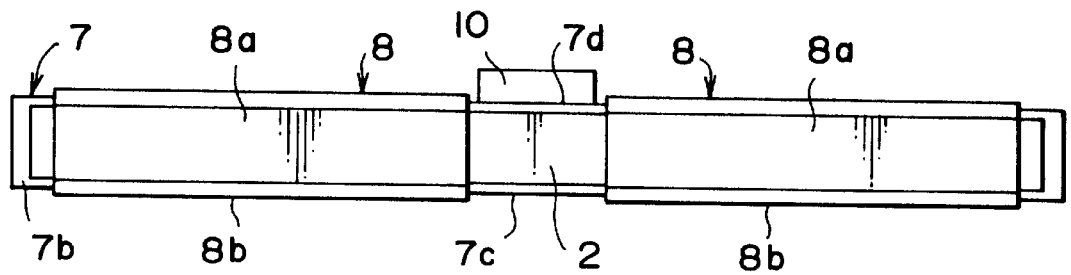
FIG. 6 is a back view showing still another embodiment of the present invention.

Embodiment 4:

FIG. 6 is a back view showing still another embodiment of an image sensor of the present invention. In the case of this embodiment, a connector 10 serving as a protruded part protruded on the side 7d of a frame 7 to transmit the output of a sensor IC 5 to an external unit is provided for the central portion of the frame 7. Thereby, a wiring pattern on a light-receiving-element mounting substrate 2 is changed so as to be connected to the connector 10 provided for the central portion. A one-side adhesive tape 8 is not provided for the portion of the connector 10. Moreover, two pieces of the one-side adhesive tape 8 divided at the portion of the connector 10 have the same length at the right and left. Other structures are the same as those of the embodiment 1.

In the case of an image sensor thus constituted, the connector 10 for transmitting the output of the sensor IC 5 to an external unit is provided for the central portion of the frame 7 and two pieces of the one-side adhesive tape 8 has the same length at the right and left. Therefore, it is possible to stably secure the light-receiving-element mounting substrate 2 at a good balance.

Figure 7:
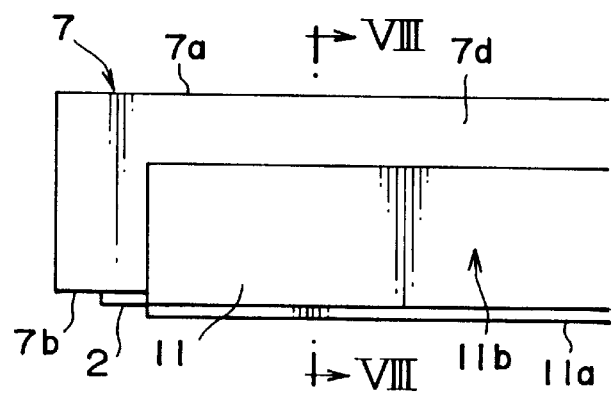
FIG. 7 is a side view showing still another embodiment of an image sensor of the present invention.
Figure 8:
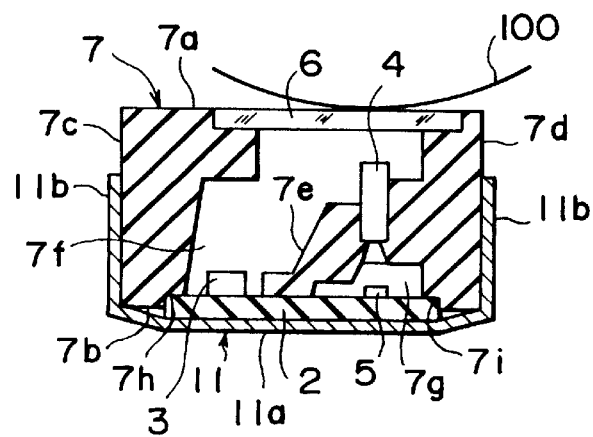
FIG. 8 is a sectional view of the embodiment in FIG. 7, taken along the line VIII—VIII in FIG. 7.
Figure 9:
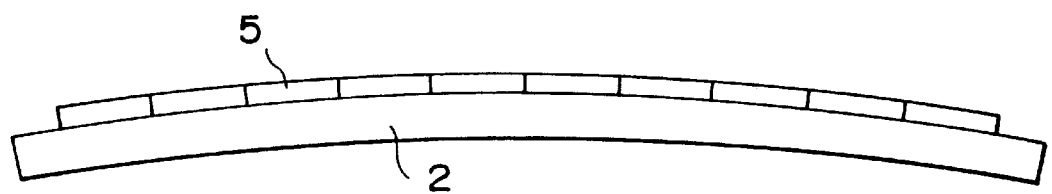
FIG. 9 is a side view showing a warped light-receiving-element mounting substrate.

Embodiment 5:

FIG. 7 is a side view showing still another embodiment of an image sensor of the present invention. FIG. 8 is a sectional view of the embodiment in FIG. 7, taken along the line VII—VII in FIG. 7. Moreover, FIG. 9 is a side view showing a warped light-receiving-element mounting substrate. In the case of this embodiment, means for securing a light-receiving-element mounting substrate 2 uses a one-side adhesive tape 11 using an aluminum foil for the base material. The one-side adhesive tape 11 is provided for the almost overall length in the longitudinal direction of the light-receiving-element mounting substrate 2 as the one-side adhesive tape 8 of the embodiment 1, its central portion 11a is pasted to the light-receiving-element mounting substrate 2, and its both ends 11b are pasted to the sides 7c and 7d of a frame 7 to secure the light-receiving-element mounting substrate 2 so as to press the light-receiving-element mounting substrate 2 against reference planes 7h and 7i. Other structures are the same as those of the embodiment 1.

A thermosetting adhesive is used as means for securing a sensor IC 5 to be mounted on the light-receiving-element mounting substrate 2. Moreover, the light-receiving-element mounting substrate 2 is made of glass epoxy and the sensor IC 5 is made of silicon. Therefore, by bonding the sensor IC 5 to the light-receiving-element mounting substrate 2 by an adhesive and thereafter heating and setting the adhesive, the light-receiving-element mounting substrate 2 warps in the direction opposite to the sensor IC 5 due to the difference between the thermal expansion coefficients of glass epoxy and silicon as shown in FIG. 9. When setting the light-receiving-element mounting substrate 2 to the frame 7 and securing it with a one-side adhesive tape, the one-side adhesive tape extends and the light-receiving-element mounting substrate 2 is lifted if the base material of the one-side adhesive tape uses a soft material. In the case of this embodiment, however, because the one-side adhesive tape 11 uses aluminum for the base material, it is possible to overcome the warping force of the light-receiving-element mounting substrate 2 and stably secure the light-receiving-element mounting substrate 2.

The base material of the one-side adhesive tape 11 can use not only an aluminum foil but also any metallic foil.

Figure 10:
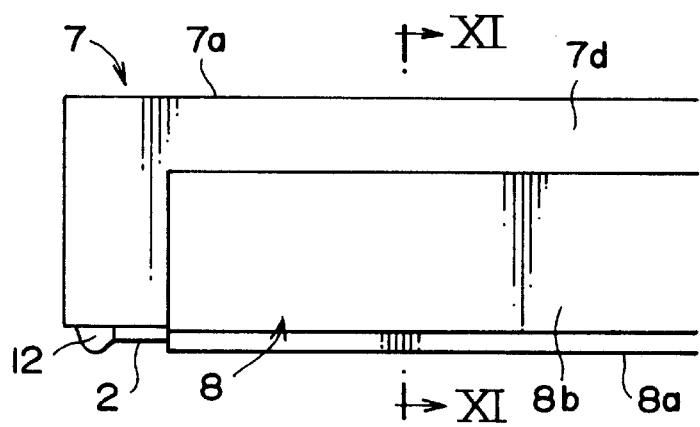
FIG. 10 is a side view showing still another embodiment of an image sensor of the present invention.
Figure 11:
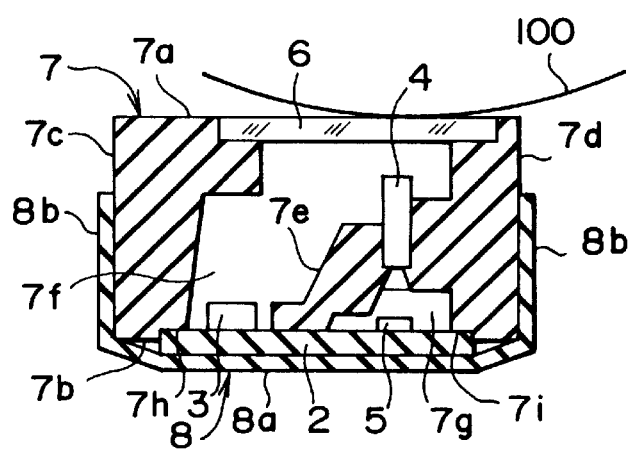
FIG. 11 is a sectional view of the embodiment in FIG. 10, taken along the line XI—XI in FIG. 10.
Figure 12:
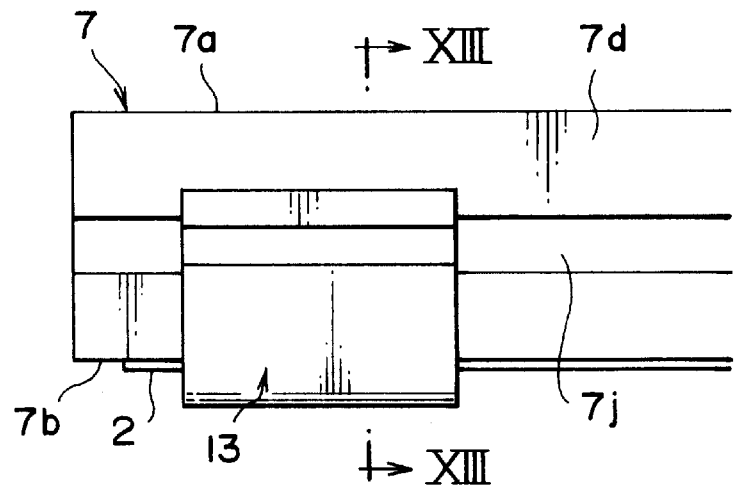
FIG. 12 is a side view of a conventional image sensor.
Figure 13:
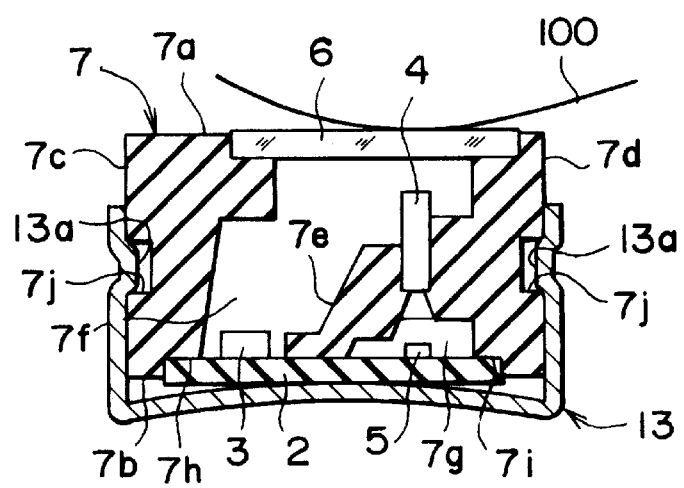
FIG. 13 is a sectional view of the image sensor in FIG. 12, taken along the line XIII—XIII in FIG. 12.

Embodiment 6:

FIG. 10 is a side view showing still another embodiment of an image sensor of the present invention. FIG. 11 is a sectional view of the embodiment in FIG. 10, taken along the line XI—XI in FIG. 10. In the case of this embodiment, the both ends of a light-receiving-element mounting substrate 2 are secured to a frame 7 by an adhesive 12 applied to the ends. Other structures are the same as those of the embodiment 1.

In the case of an image sensor thus constituted, because the both ends of the light-receiving-element mounting substrate 2 are secured to the frame 7, it is possible to prevent the light-receiving-element mounting substrate 2 shown in FIG. 9 from warping and stably secure the light-receiving-element mounting substrate 2.

An image sensor of claim 1 comprises a frame having a first plane contacting with a manuscript to be read, a second plane facing the first plane, and two sides connecting the first and second planes, in which a hollow portion having apertures on the first and second planes respectively is formed, a light source set in the hollow portion to apply light to the manuscript to be read through the aperture formed on the first plane, condensing means supported by the frame in the hollow portion to condense the light reflected from the manuscript to be read, a light-receiving-element mounting substrate set so as to cover the aperture formed on the second plane by turning the mounting plane thereof toward the hollow portion, a light-receiving element mounted on the mounting plane of the light-receiving-element mounting substrate so as to face the condensing means to receive the reflected light condensed by the condensing means, and an adhesive tape pasted so as to cover the back of the light-receiving-element mounting substrate and two sides of the frame to secure the light-receiving-element mounting substrate to the second plane by bringing the substrate into close contact with the second plane. Therefore, the light-receiving-element mounting substrate is always secured to the second plane at a proper uniform pressure. Thus, it is possible to accurately keep the position of the light-receiving element to the manuscript to be read and thereby, the resolution of the image sensor is preferably kept.

In the case of an image sensor of claim 2, the adhesive tape is transparent. Therefore, when pasting the adhesive tape, an operator can confirm the positions of a light-receiving-element mounting substrate and a frame through the one-side adhesive tape. The position of the one-side adhesive tape 8 is not deviated or no ununiform pressure is applied.

In the case of an image sensor of claim 3, at least one corner formed by the second plane and the side of the frame is chamfered. Therefore, it is possible to moderate an angle at which an adhesive tape is folded and thus, the force for the adhesive tape to pull a light-receiving-element mounting substrate toward the frame is greatly stabilized and it is possible to more accurately keep the position of the light-receiving-element mounting substrate to a manuscript to be read.

In the case of an image sensor of claim 4, a protruded part protruded on the back of the light-receiving-element mounting substrate or an exposed part exposed on the back of the light-receiving-element mounting substrate is provided for the central portion in the longitudinal direction of the light-receiving-element mounting substrate, the adhesive tape is divided into two pieces not so as to cover the protruded or exposed part, and the two pieces of the adhesive tape have the same length. Therefore, it is possible to stably secure the light-receiving-element mounting substrate at a good balance.

In the case of an image sensor of claim 5, a protruded part protruded on the side of the frame or an exposed part exposed on the side of the frame is provided for the central portion in the longitudinal direction of the frame the adhesive tape is divided into two pieces not so as to cover the protruded part or exposed part, and the two pieces of the adhesive tape have the same length. Therefore, it is possible to stably secure the light-receiving-element mounting substrate at a good balance.

In the case of an image sensor of claim 6, the adhesive tape is made by using a metallic foil as the base material. Therefore, it is possible to overcome the force for a light-receiving-element mounting substrate to warp and stably secure the light-receiving-element mounting substrate.

In the case of an image sensor of claim 7, the both ends of the light-receiving-element mounting substrate are bonded to a frame. Therefore, warpage of the secured both ends of the light-receiving-element mounting substrate is controlled. As a result, it is possible to more accurately keep the position of a light-receiving element to a manuscript to be read.

What is claimed is:

1. An image sensor comprising:

a frame having a first plane contacting with a manuscript to be read, a second plane facing said first plane, and two sides connecting said first and second planes, in which a hollow portion having apertures on said first and second planes respectively is formed;

a light source set in said hollow portion to apply light to said manuscript to be read through said aperture formed on said first plane;

condensing means supported by said frame in said hollow portion to condense the light reflected from said manuscript to be read;

a light-receiving-element mounting substrate set so as to cover said aperture formed on said second plane by turning the mounting plane thereof to said hollow portion;

a light-receiving element mounted on said mounting plane of said light-receiving-element mounting substrate so as to face said condensing means to receive the reflected light condensed by said condensing means; and an adhesive tape pasted so as to cover the back of said light-receiving-element mounting substrate and two sides of said frame to secure said light-receiving-element mounting substrate to said second plane by bringing said substrate into close contact with said second plane.

2. An image sensor according to claim 1, wherein said adhesive tape is transparent.

3. An image sensor according to claim 1, wherein at least one corner formed by said second plane and said side of said frame is chamfered.

4. An image sensor according to claim 1, wherein a protruded part protruded on the back of said light-receiving-element mounting substrate or an exposed part exposed on the back of said light-receiving-element mounting substrate is provided for the central portion in the longitudinal direction of said light-receiving-element mounting substrate, said adhesive tape is divided into two pieces not so as to cover said protruded part or exposed part, and the two pieces of said adhesive tape have the same length.

5. An image sensor according to claim 1, wherein a protruded part protruded on the side of said frame or an exposed part exposed on the side of said frame is provided for the central portion in the longitudinal direction of said frame, said adhesive tape is divided into two pieces not so as to cover said protruded part or exposed part, and the two pieces of said adhesive tape have the same length.

6. An image sensor according to claim 1, wherein said adhesive tape is made by using a metallic foil as the base material.

7. An image sensor according to claim 1, wherein the both ends of said light-receiving-element mounting substrate are bonded to said frame respectively.

* * * * *